United States Patent
Breternitz, Jr. et al.

(10) Patent No.: US 7,620,781 B2
(45) Date of Patent: Nov. 17, 2009

(54) EFFICIENT BLOOM FILTER

(75) Inventors: Mauricio Breternitz, Jr., Austin, TX (US); Youfeng Wu, Palo Alto, CA (US); Peter G. Sassone, Austin, TX (US); Jeffrey P. Rupley, II, Round Rock, TX (US); Wesley Attrot, Austin, TX (US); Bryan Black, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 11/642,314

(22) Filed: Dec. 19, 2006

(65) Prior Publication Data

US 2008/0147714 A1  Jun. 19, 2008

(51) Int. Cl.
*G06F 12/0026* (2006.01)
(52) U.S. Cl. .................................. 711/154; 707/102
(58) Field of Classification Search ............... 711/154; 707/102
See application file for complete search history.

(56) References Cited

U.S. PATENT DOCUMENTS

| | | | |
|---|---|---|---|
| 7,234,019 B1* | 6/2007 | Kao et al. ............... | 711/5 |
| 2005/0120004 A1* | 6/2005 | Stata et al. .............. | 707/3 |
| 2005/0195832 A1* | 9/2005 | Dharmapurikar et al. ............ | 370/395.31 |
| 2007/0115986 A1* | 5/2007 | Shankara ............... | 370/392 |
| 2007/0136331 A1* | 6/2007 | Hasan et al. ........... | 707/100 |
| 2008/0071903 A1* | 3/2008 | Schuba et al. .......... | 709/224 |

* cited by examiner

*Primary Examiner*—Christian P Chace
*Assistant Examiner*—Hashem Farrokh
(74) *Attorney, Agent, or Firm*—Blakely, Sokoloff, Taylor & Zafman LLP

(57) ABSTRACT

Implementation of a Bloom filter using multiple single-ported memory slices. A control value is combined with a hashed address value such that the resultant address value has the property that one, and only one, of the k memories or slices is selected for a given input value, a, for each bank. Collisions are thereby avoided and the multiple hash accesses for a given input value, a, may be performed concurrently. Other embodiments are also described and claimed.

25 Claims, 8 Drawing Sheets

```
Boolean Bloom_array [ M ] ;  // The Bloom Filter array; M is the size
Integer Function Hash(Value)
{
    Me = get_my_thread_ID( ); // get ID of this processor (total of k
    processors)                                                          ID
                                                                      Module
                                                                        802

// Hc: Use Argument 'Me' to decide which hash to apply
    // Each hash function computes a hash value in range 0.. M/k Switch(Me){
        Case 0: Range_Hash = Hash_0(Value); break;
        Case 1: Range_Hash = Hash_1(Value); break;          Hash Module
           ...                                                  804
        Case k: Range_Hash = Hash_k(Value); break;
    }
                                                              Slice Size
    SliceSize = M/numThreads;                               Module 806

Return_Index = ( UniqueSlice(Me) * SliceSize) + Range_Hash;
}
                        Control Module 808

Combine
                            Module
                              808
```

FIG. 8

EFFICIENT BLOOM FILTER

BACKGROUND

1. Technical Field

The present disclosure relates generally to information processing systems and, more specifically, to a low-collision Bloom filter.

2. Background Art

A Bloom filter is a probabilistic algorithm to quickly test membership in a large set using multiple hash functions into an array of bits. The use of Bloom filters is known in the art, and originates from the seminal paper written by B. Bloom, "Space/Time Trade-Offs in Hash Coding with Allowable Errors," *Comm. ACM*, vol. 13, no. 7, May 1970, pp. 422-426.

Bloom filters are space-efficient structures that support fast constant-time insertion and queries. A Bloom filter supports (probabilistic) membership queries in a set $A=\{a_1, a_2, \ldots, a_n\}$ of n elements (also called keys).

A Bloom filter quickly filters (i.e., identifies), non-members without querying the large set by exploiting the fact that a small percentage of erroneous classifications can be tolerated. When a Bloom filter identifies a non-member, it is guaranteed to not belong to the large set. When a Bloom filter identifies a member, however, it is not guaranteed to belong to the large set. In other words, the result of the membership test is either: it is definitely not a member, or, it is probably a member.

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of systems, methods and mechanisms to implement a low-collision Bloom filter in a computing system using single-ported memory banks.

FIG. 8 is a table diagram illustrated pseudocode for Bloom filter logic modules to implement at least one embodiment of the method shown in FIG. 6.

DETAILED DESCRIPTION

The following discussion describes selected embodiments of methods, systems and mechanisms to implement a low-collision Bloom filter using single-ported memory banks. The apparatus, system and method embodiments described herein may be utilized with single-core or multi-core systems. In the following description, numerous specific details such as processor types, multicore system configurations, and circuit layout have been set forth to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring the present invention.

Figure 1:
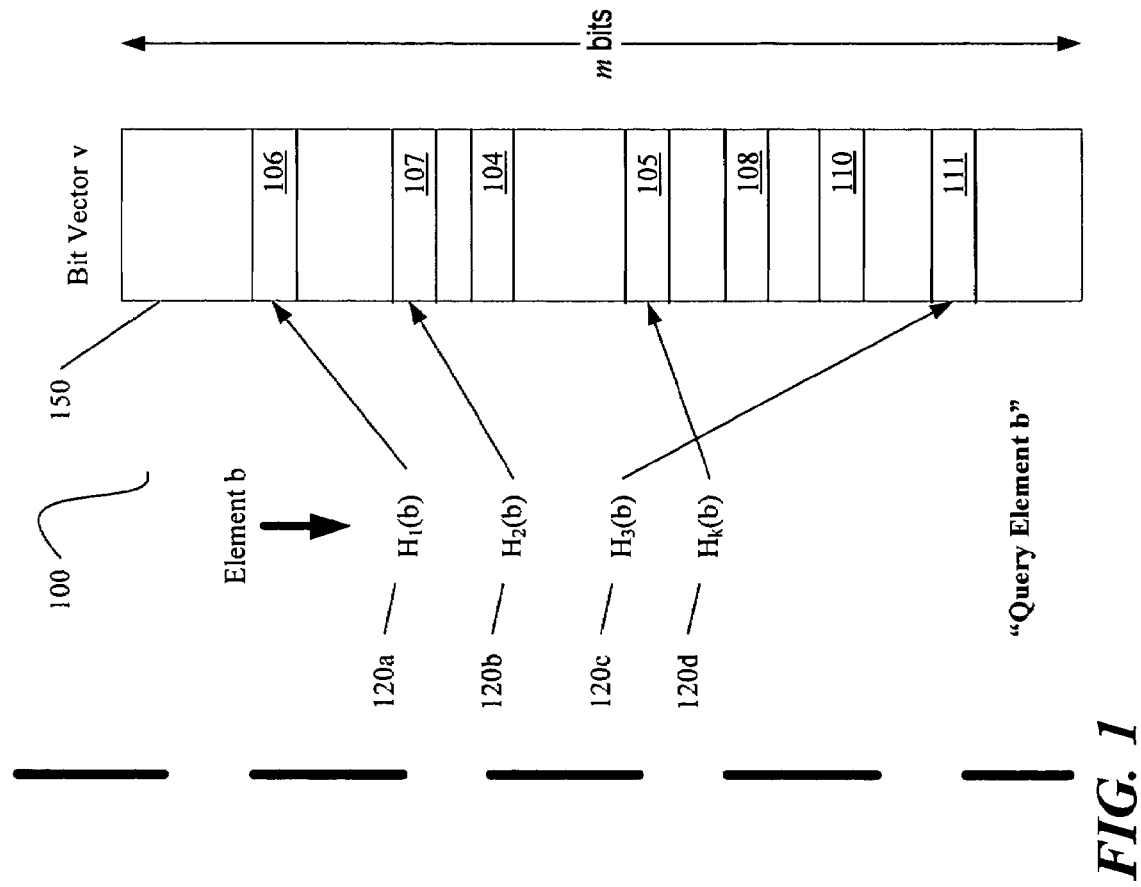
FIG. 1 is a block diagram illustrating a traditional Bloom filter.
Figure 1:
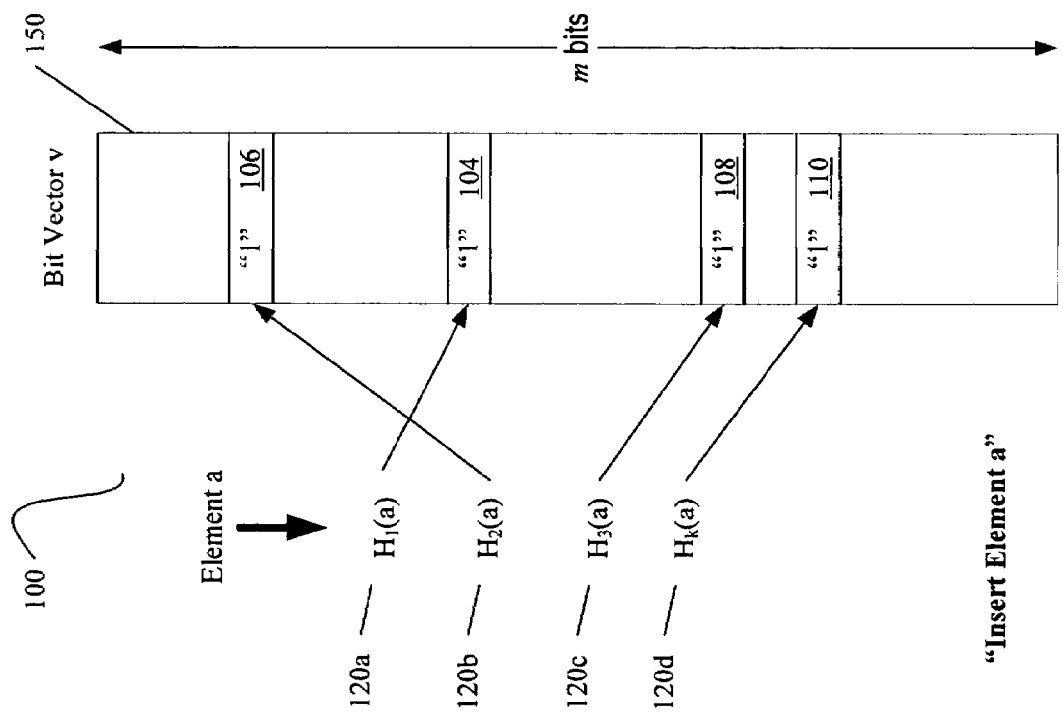

FIG. 1 is a block diagram illustrating a traditional Bloom filter 100 with four hash functions 120a-120d. The basic idea is to allocate a vector v of m bits, initially all set to 0, and then choose k independent hash functions, h1, h2, . . . , hk, each with range $\{1, \ldots, m\}$.

The Bloom filter 100 illustrated in FIG. 1 is implemented with a multi-ported memory 150, where the memory 150 has k ports. In this manner, the k array positions 104, 106, 108, 110 of the memory 150 may be written or queried in parallel.

The left-hand side of FIG. 1 illustrates insertion of an element (a) into a set (A). To insert an element $a \in A$, the bits (104, 106, 108, 110, respectively) at positions $h_1(a)$, $h_2(a)$, . . . , $h_k(a)$ in v are set to "1". (A particular bit might be set to "1" multiple times). It should be understood that "1" or "true" as used herein is not intended to be limited to any particular value. For at least one embodiment, the value "1" is implemented as a one-bit logic-high value. However, this example embodiment should not be taken to be limiting. Instead, for alternative embodiments the "1" value may be a logic-low value or may be a multi-bit value.

The right-hand side of FIG. 1 illustrates a query to determine if an element (b) is a member of the set (A). FIG. 1 illustrates that, to query for an element (to test if it is in set A), the element is fed into each of the k hash functions, resulting in k bit positions. Given a query for b, the bits (106, 107, 111, 105, respectively) at positions $h_1(b)$, $h_2(b)$, . . . , $h_k(b)$ are checked. Again, because the Bloom filter 100 illustrated in FIG. 1 is implemented with a k-ported memory 150, the k array positions (positions $h_1(b)$, $h_2(b)$, . . . , $h_k(b)$) may be checked in parallel.

If any of the bits is "0", then b is not in the set A. (If the element were in the set, then presumably all such bits would have been set to "1" when the element was added to the set). Otherwise, if all bits are "1", then either the element is in the set, or the bits have been set to "1" during the insertion of other elements. Thus, if all bits are set to "1", it may be assumed that b is in the set although there is a certain probability that this is not true (because the bits may have been set during the insertion of other elements). The (relatively rare) case in which the bits are set for the insertion of other elements, is called a "false positive" or "false drop", when the query erroneously indicates membership in the set for element b.

Bloom filters may be used in a wide variety of applications. They may be used, for example, to minimize expensive searches in a Web server by maintaining a set of cached objects. Also, for example, Bloom filters may be used in network packet processing to detect packet sub-strings. They may also be used, for example, in various cache schemes. Regarding caches, they may be used, for example, to estimate cache hit probability in order to aid in speculation regarding the scheduling of long-latency operations in an out-of-order processor, to implement set-associative caches, to reduce snooping in multi-processor snoop-based coherence protocols.

Many of the current implementations of Bloom filters, including those for some of the applications discussed in the preceding paragraph, rely on multi-ported memories (such as 150 illustrated in FIG. 1) or multi-banked memories in order to compute the hash functions in parallel. If, instead, a Bloom filter were implemented with a single-ported memory, the query for each of the k hashes must occur serially, which is a relatively slow approach.

In contrast, with multi-ported memories the k hash functions may be computed in parallel, and each of the k bits of the hash may be checked in parallel via k memory ports as described above. However, multi-ported memories typically incur relatively higher cost in terms of power and area. Thus, they are fast but are big and expensive.

An alternative is to break the Bloom filter up into k smaller memories, each with its own port. However, this multi-banked memory implementation of Bloom filters may restrict the range (1 . . . m) of hash functions, thus increasing the probability of false positives.

For both multi-ported and multi-banked implementations, if accessed in parallel, there is a risk of collisions if two of the hash functions attempt to access a single port at the same time.

Figure 2:
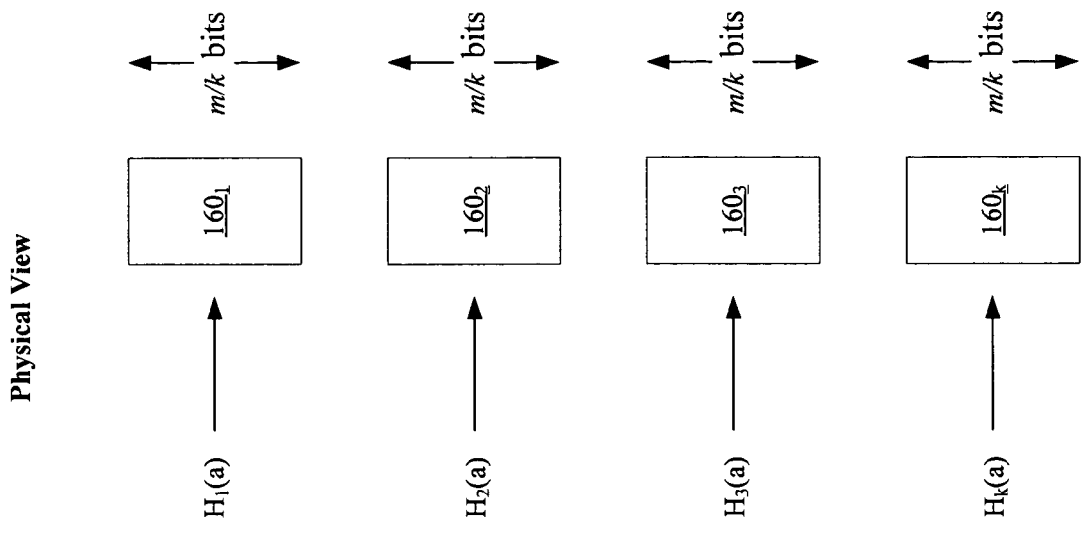
FIG. 2 is a block diagram illustrating at least one embodiment of a multi-banked Bloom filter implementation that avoids the cost of using multi-ported memories.
Figure 2:
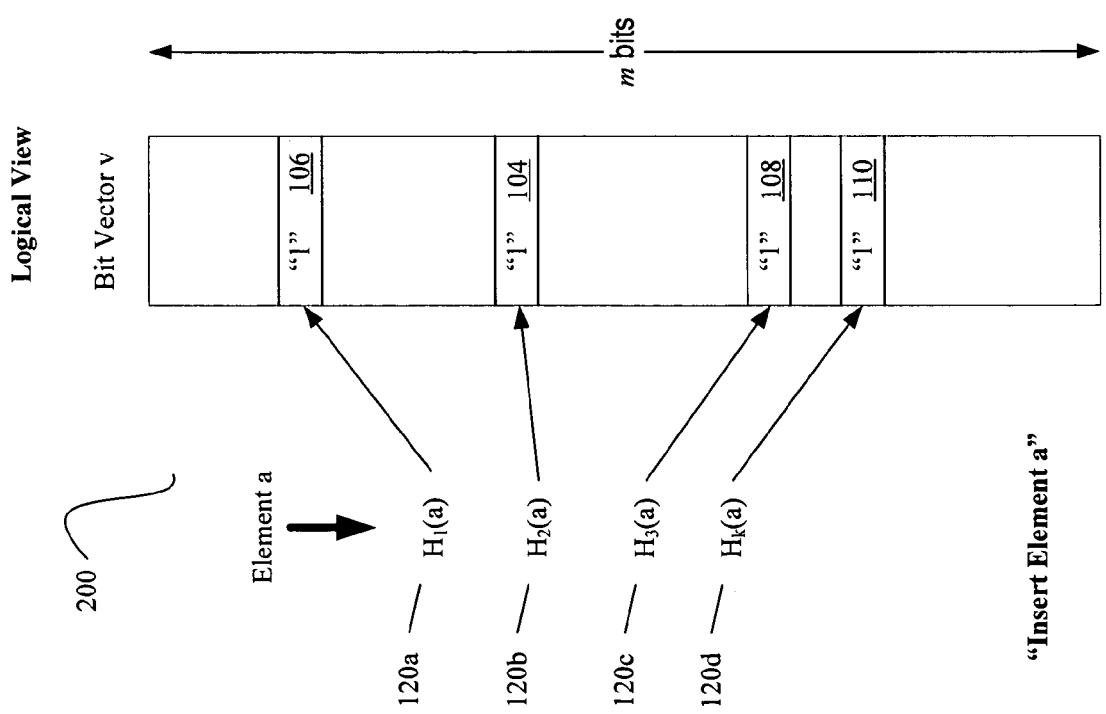

FIG. 2 is a block diagram illustrating a sample embodiment of a multi-banked Bloom filter implementation that avoids the cost of using multi-ported memories. While the Bloom filter 200 shown in FIG. 2 is logically the same as that 100 shown in FIG. 1, FIG. 2 illustrates that the physical implementation of the Bloom filter 200 is different. That is, the embodiment 200 illustrated in FIG. 2 utilizes k single-ported memory banks $160_1$-$160_k$ rather a single k-ported memory 150 (FIG. 1).

Like the multi-ported implementation 100 illustrated in FIG. 1, the physical organization of the k-banked Bloom filter 200 illustrated in FIG. 2 allows parallel computation of the hash functions 120a-120d. However, the k-banked implementation 200 may suffer a higher false positive probability than the k-ported implementation 100 illustrated in FIG. 1. There is a clear tradeoff between m (the size of the Bloom filter) and the probability of a false positive.

The k-ported memory 150 implementation 100 shown in FIG. 1 has a false positive probability of $(1-e^{-kn/m})^k$. In contrast, the FIG. 2 implementation 200 using k single-ported memory banks $160_1$-$160_k$ will have a much higher probability of false positives (due to the higher rate of collisions as a consequence of the smaller size of each Bloom Filter).

To find the probability of false positives where n is the number of accesses to one bank 160 for the FIG. 2 physical implementation, the following equation may be used:

$$(1-(1-1/m)^{kn})^k \quad (1)$$

Note that $$\left(1-\left(1-\frac{1}{m}\right)^{kn}\right)^k \approx (1-e^{-kn/m})^k$$

Applying equation (1) using m'=m/k and k=1, equation (1) becomes $(1-(1-k/m)^n)$.

Since there are 'k' banks in the FIG. 2 embodiment 200, the probability of false positives in such embodiment 200 is therefore:

$$(1-(1-k/m)^n)^k \quad (2)$$

From equations (1) and (2) it is seen that the embodiment 200 illustrated in FIG. 2 has a higher probability of false positives than the k-ported embodiment 100 illustrated in FIG. 1.

Thus, a physical implementation of a Bloom filter using multiple banked single-ported memories is a lower-cost alternative to a multi-ported memory, while still allowing parallel computation of hash functions. However, in such multi-banked implementations, each bank has a smaller range for 'm' in each bank than a single multi-ported bank, thereby raising the probability of false positives.

Figure 3:
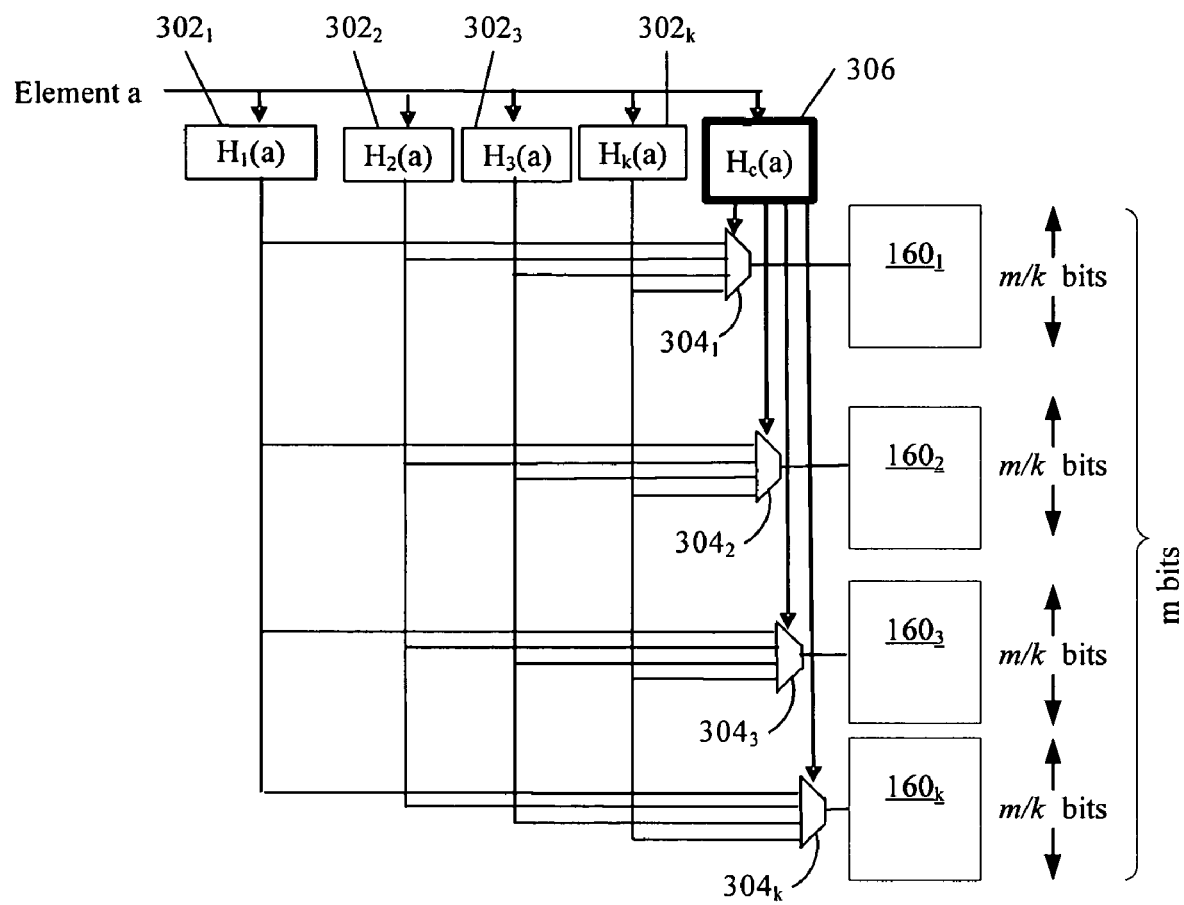
FIG. 3 is a block diagram illustrating at least one embodiment of a Bloom filter implementation that preserves the range of hash functions using single-ported memories.

FIG. 3 is a block diagram illustrating a Bloom filter implementation technique that preserves the range of hash functions (e.g., achieving the same resilience to false positives as a k-ported implementation) in contrast to the multi-banked implementation 200 discussed above, while at the same time allowing the use of multi-banked single-ported memories, thus enabling parallel computation of hash functions for a Bloom filter. The Bloom filter implementation 300 illustrated in FIG. 3 thus achieves the collision probability of multi-ported memory implementations while using k single-ported memories.

FIG. 3 illustrates that the Bloom filter 300 includes k hash circuits $302_1$-$302_k$. Each of the hash circuits $302_1$-$302_k$ of the Bloom filter is devised implement a hash function ($H_1(a)$-$H_k(a)$, respectively), where each of the hash functions ranges over the whole set of bits in the filter (from bits 1 to m). In order have k single-ported memory banks without collision, the hash functions $H_1(a)$-$H_k(a)$ are also devised to guarantee that, if one of the k bits hashes to a particular one of the k banks, none of the other bits will hash to that particular bank.

For example, if function $H_1(a)$ hashes to a bit in the second bank ($160_2$), then function $H_2(a)$, by design, hashes to a bit in one of the other banks ($160_1$ or $160_3$-$160_k$). Similarly, function $H_3(a)$ is devised such that whenever $H_1(a)$ and $H_2(a)$ have chosen bits in two banks, then $H_3(a)$ chooses a bit in one of the two remaining banks. Finally $H_k(a)$ chooses a bit in the remaining bank that has not already been chosen. Each $H_i$ function hashes the input value a over m/k bits.

The hash functions may each be part of a set of bits that, when combined with a control value (also referred to herein as "selector bits"), are devised such that, mathematically, each of the combined values for a given input value, a, is guaranteed to pick a different one of the k banks ($160_1$ through $160_k$). This combined set of bits is referred to herein as a "combined bit value". For at least one embodiment, this particular feature of the combined bit value is realized by using certain bits within the combined bit value as selector bits to select a unique one of the remaining memory banks $160_1$ through $160_k$ that has not already been selected by any of the combined bit values for a particular value of a. Any bits of the combined bit value may used as selector bits.

For at least one embodiment, the selector bits are generated by a control circuit 306, which implements a bank selection control function, $H_c$. That is, the circuit 306 generates a control value. A control value generated by the hash function $H_c$, which is implemented in control circuit 306, may be appended onto the values generated by hash functions $H_1$ through $H_k$, at the end or beginning or at any intermixed location with the hash values generated by the hash circuits $302_1$-$302_k$. That is, each of the hash values may be combined with a control value in any manner (pre-pended, appended, or intermixed) to generate a combined bit value. The combined bit value has the property that it uniquely selects one of the k memories for any given input value, a, and therefore avoids collisions for the value a.

The example embodiment 300 illustrated in FIG. 3 uses an extra hash function $H_c(a)$, implemented by circuit 306, to select the target bank (from $160_1$ through $160_k$) for each hash function. The output of function $H_c(a)$ controls a multiplexer $304_1$-$304_k$ on the address input for each bank $160_1$-$160_k$. The mux selection is set up such that, for a given control value, $H_c(a)$, each bank $160_1$ through $160_k$ selects a different input.

While the following example is discussed in connection with a sample embodiment having k=4 single-ported banked memories $160_1$-$160_k$, one of skill in the art will understand that such example is not intended to be limiting but is instead set forth for explanatory purposes only. The embodiment illustrated in FIG. 3 may utilize more or fewer memory banks.

For a four-bank embodiment, for example, a simple Hc(a) could use the value of a to select one of the 24 permutations of (0, 1, 2, 3) for the four muxes $304_1$-$304_k$. For the embodiment illustrated in FIG. 3, the hashing functionality for the Bloom filter mathematically combines the hash value and the control value. This organization is more resilient to artifacts in the hashing functions. For example, if one hashing function turns out to be ill-suited for a given input, the controlling hash function $H_c$ maps that function over k banks, thus reducing the probability of collisions.

While FIG. 3 illustrates the selection of banks $160_1$-$160_k$ via a hardware circuit, it should be understood that alternative embodiments may perform such selection via software logic, firmware, or any combination of hardware, firmware and/or software. For instance, at least on alternative embodiment of the Bloom filter illustrated in FIG. 3 may implement one or more of the hash functions $H_1(a)$-$H_k(a)$ and/or $H_c(a)$ as software modules $302_1$-$302_k$, rather than as hardware circuits.

Figure 4:
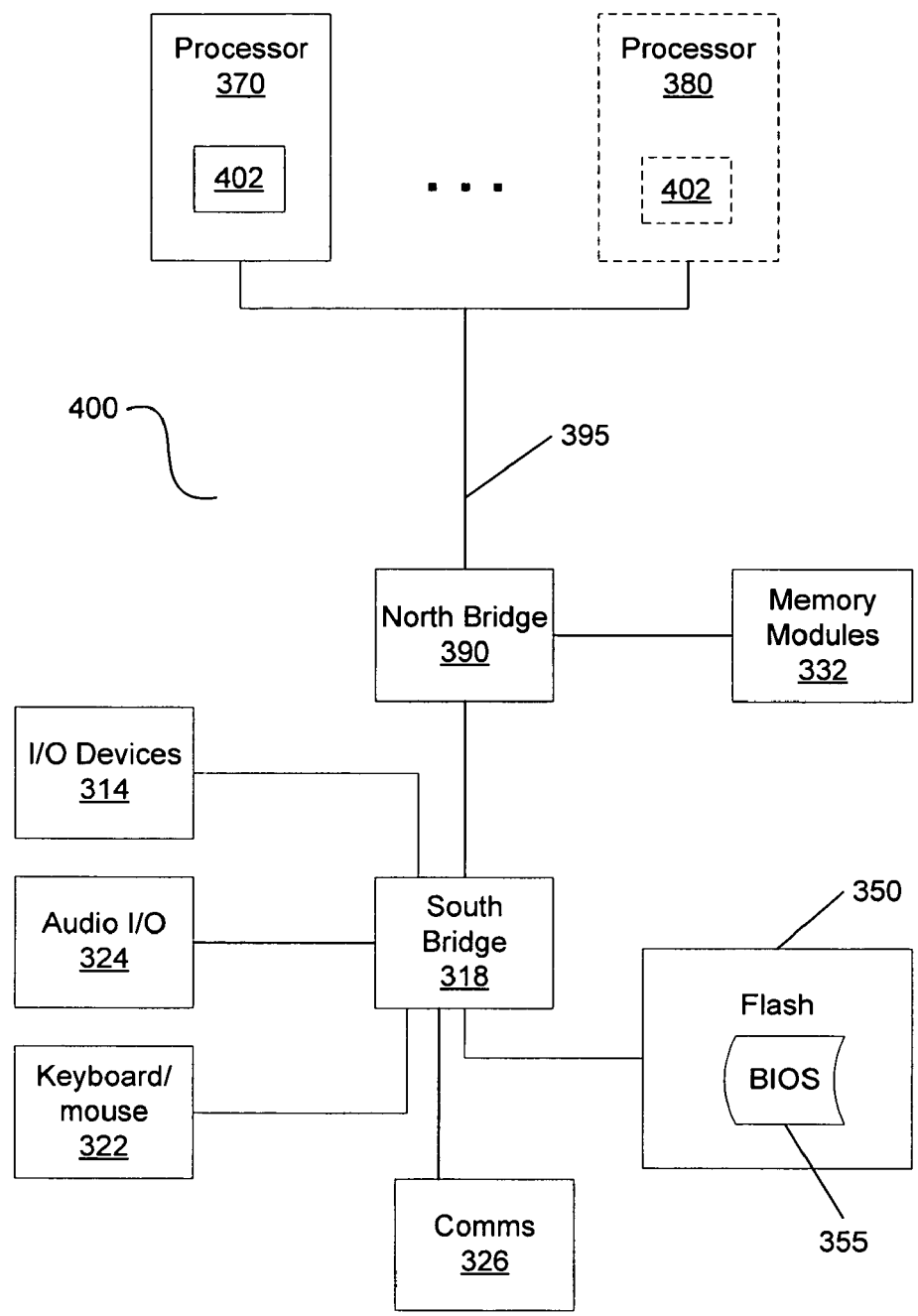
FIG. 4 is a block diagram of at least one embodiment of a first system capable of performing disclosed techniques.

FIG. 4 is a block diagram of a first embodiment of a system 400 capable of performing disclosed techniques. The system 400 may include one or more processors 370, 380, which are coupled to a north bridge 390. The optional nature of additional processors 380 is denoted in FIG. 4 with broken lines.

First processor 370 and any other processor(s) 380 (and more specifically the cores therein) may include Bloom filter logic 402 in accordance with an embodiment of the present invention. For a first embodiment, the Bloom filter logic 402 may be hardware circuitry (see, e.g., 300 of FIG. 3). Alternatively, rather than being a hardware circuit, the Bloom filter logic 402 may be one or more software or firmware modules. At least one embodiment of a software embodiment of the Bloom filter logic disclosed herein is discussed below in connection with FIGS. 6 and 8.

The north bridge 390 may be a chipset, or a portion of a chipset. The north bridge 390 may communicate with the processor(s) 370, 380 and control interaction between the processor(s) 370, 380 and memory 332. The north bridge 390 may also control interaction between the processor(s) 370, 380 and Accelerated Graphics Port (AGP) activities. For at least one embodiment, the north bridge 390 communicates with the processor(s) 370, 380 via a multi-drop bus, such as a frontside bus (FSB) 395.

FIG. 4 illustrates that the north bridge 390 may be coupled to another chipset, or portion of a chipset, referred to as a south bridge 318. For at least one embodiment, the south bridge 318 handles the input/output (I/O) functions of the system 300, controlling interaction with input/output components. Various devices may be coupled to the south bridge 318, including, for example, a keyboard and/or mouse 322, communication devices 326 and flash memory 350 which may include code BIOS code 355, in one embodiment. Further, an audio I/O 324 may be coupled to the south bridge 318, as may be other I/O devices 314.

Figure 5:
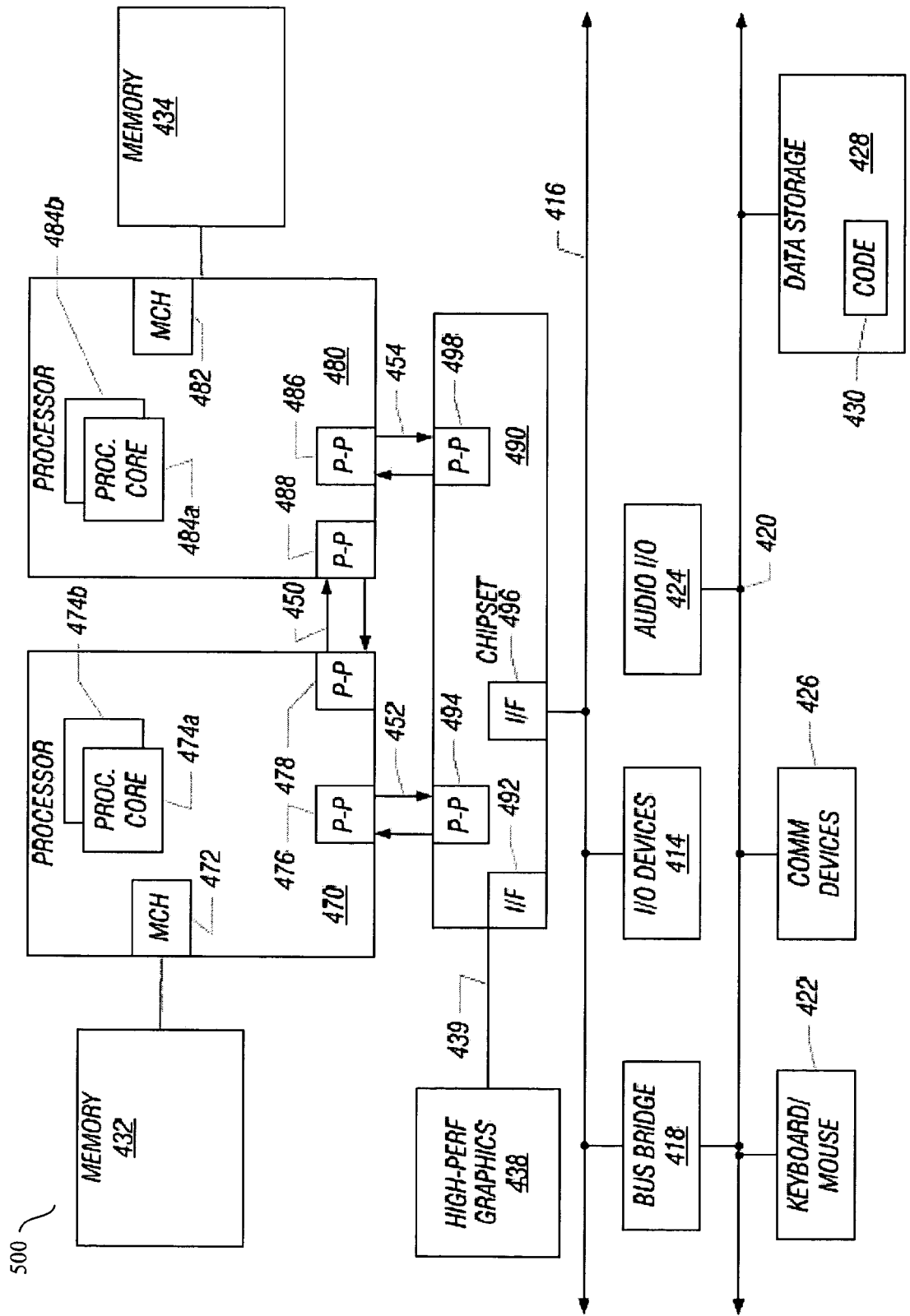
FIG. 5 is a block diagram of at least one embodiment of a second system capable of performing disclosed techniques.

Embodiments of the present invention may be implemented in many different system types. Referring now to FIG. 5, shown is a block diagram of a multiprocessor system in accordance with an embodiment of the present invention. As shown in FIG. 5, the multiprocessor system is a point-to-point interconnect system, and includes a first processor 470 and a second processor 480 coupled via a point-to-point interconnect 450. As shown in FIG. 5, each of processors 470 and 480 may be multicore processors, including first and second processor cores (i.e., processor cores 474a and 474b and processor cores 484a and 484b). While not shown for ease of illustration, first processor 470 and second processor 480 (and more specifically the cores therein) may include Bloom filter logic in accordance with an embodiment of the present invention (see, e.g. 300 of FIG. 3; see, e.g., 600 of FIG. 6; see, e.g., 800 of FIG. 8).

Rather having a north bridge and south bridge as shown above in connection with FIG. 4, the system 500 shown in FIG. 5 may instead have a hub architecture. The hub architecture may include an integrated memory controller hub Memory Controller Hub (MCH) 472, 482 integrated into each processor 470, 480. A chipset 490 may provide control of Graphics and AGP.

Thus, the first processor 470 further includes a memory controller hub (MCH) 472 and point-to-point (P-P) interfaces 476 and 478. Similarly, second processor 480 includes a MCH 482 and P-P interfaces 486 and 488. As shown in FIG. 5, MCH's 472 and 482 couple the processors to respective memories, namely a memory 432 and a memory 434, which may be portions of main memory locally attached to the respective processors.

While shown in FIG. 5 as being integrated into the processors 470, 480, the memory controller hubs 472, 482 need not necessarily be so integrated. For at least one alternative embodiment, the logic of the MCH's 472 and 482 may be external to the processors 470, 480, respectively. For such embodiment one or more memory controllers, embodying the logic of the MCH's 472 and 482, may be coupled between the processors 470, 480 and the memories 432, 434, respectively. For such embodiment, for example, the memory controller(s) may be stand-alone logic, or may be incorporated into the chipset 490.

First processor 470 and second processor 480 may be coupled to the chipset 490 via P-P interconnects 452 and 454, respectively. As shown in FIG. 5, chipset 490 includes P-P interfaces 494 and 498. Furthermore, chipset 490 includes an interface 492 to couple chipset 490 with a high performance graphics engine 438. In one embodiment, an Advanced Graphics Port (AGP) bus 439 may be used to couple graphics engine 438 to chipset 490. AGP bus 439 may conform to the *Accelerated Graphics Port Interface Specification, Revision* 2.0, published May 4, 1998, by Intel Corporation, Santa Clara, Calif. Alternately, a point-to-point interconnect 439 may couple these components.

In turn, chipset 490 may be coupled to a first bus 416 via an interface 496. In one embodiment, first bus 416 may be a Peripheral Component Interconnect (PCI) bus, as defined by the *PCI Local Bus Specification, Production Version, Revision* 2.1, dated June 1995 or a bus such as the PCI Express bus or another third generation input/output (I/O) interconnect bus, although the scope of the present invention is not so limited.

As shown in FIG. 5, various I/O devices 414 may be coupled to first bus 416, along with a bus bridge 418 which couples first bus 416 to a second bus 420. In one embodiment, second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Note that other architectures are possible. For example, instead of the point-to-point architecture of FIG. 5, a system may implement a multi-drop bus or another such architecture.

Figure 6:
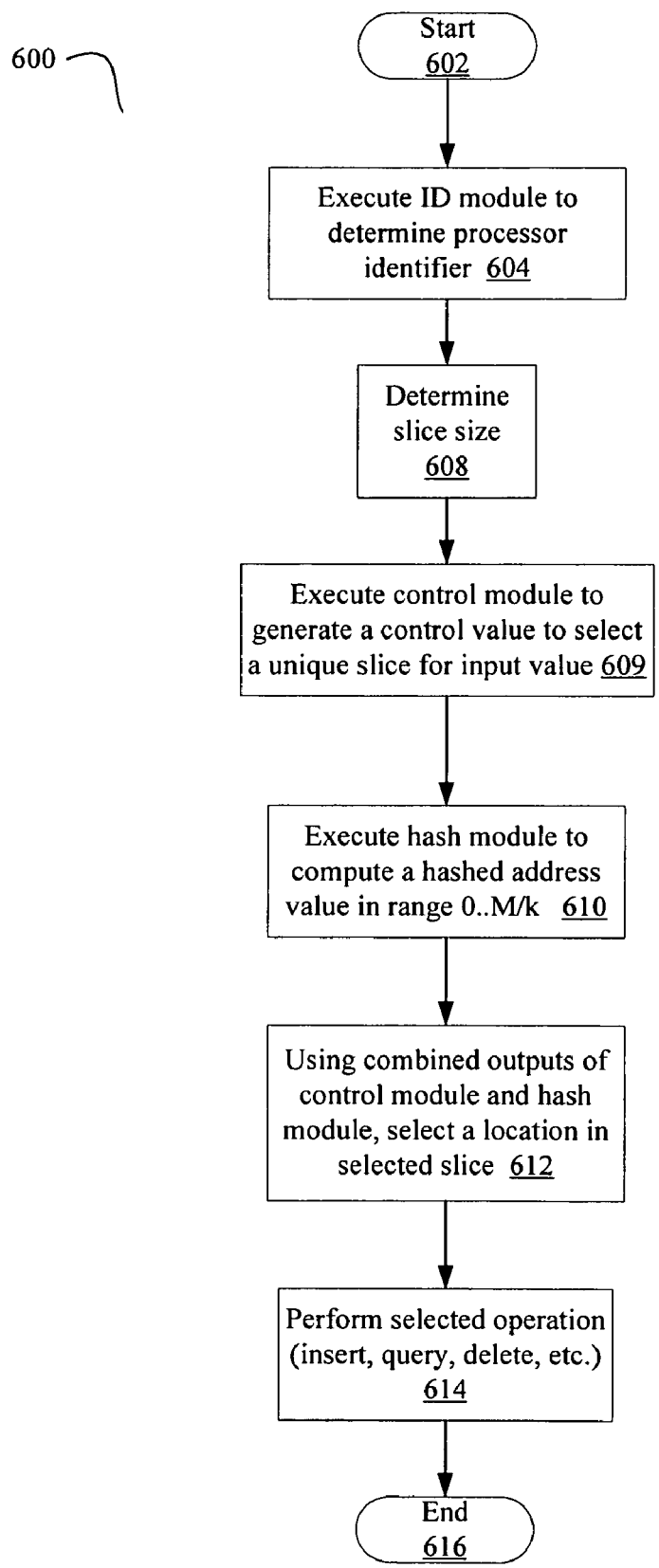
FIG. 6 is a flowchart illustrating at least one embodiment of a method for performing Bloom filter logic in a multi-core processing system.

FIG. 6 is a flowchart illustrating at least one embodiment of a method 600 for performing Bloom filter logic in a multi-core processing system. For at least one embodiment, the method 600 is performed concurrently by multiple processors in the multi-core system. It will be understood by one of skill in the art that the blocks of the method 600 are shown in a particular order merely for convenience, and that the operations need not necessarily be performed in the order shown.

FIG. 6 illustrates that the method 600 begins at block 602 and proceeds to block 604. At block 604, the processor that is executing the method 600 determines its unique identifier, which distinguishes the processor from other processor cores in the system. Processing then proceeds to block 608.

At block 608, the processor that is performing the method 600 determines the size of the slice of the Bloom filter array that has been partitioned for each processor. For example, if the bloom filter array has m memory locations, and there are k processors, then the slice size may be determined at block 608 to be of size m/k.

Processing then proceeds to block 609, where a control module is executed. For at least one embodiment, the control module calculates, for each processor, a unique one of the slices to be used for the hashing operation to be performed (e.g., add, delete, or query). It should be noted that the logic of the control module is such that any one of the processor may be assigned to any slice—that is, each of the processors has access to the full range of the Bloom filter array entries. However, the control module logic is such that, once a particular slice is selected for one of the processors, that same slice is not selected for any other processor during the hashing function for a given input value. From block 609, processing proceeds to block 610.

At block 610, a hash module is performed in order to determine a particular address within the slice that is to be written. Processing then proceeds to block 612.

At block 612, the output of the control module, calculated at block 609, and the output of the hash module, calculated at block 610, are combined. The manner of combination is a matter of design choice and is not limited herein. For example, for at least one embodiment the output of the control module may be pre-pended or appended to the output of the hash function. For at least one other embodiment, the outputs of the control and hash modules may be intermixed to create a combined value. At block 612, this combined value is generated in order to provide a value that indicates a particular address in a particular slice of the Bloom filter array. Processing then proceeds to block 614.

At block 614, the processor that is performing the method 600 utilizes the combined value created at block 612 in order to access the appropriate slot in the Bloom filter array in order to perform the processor's part of the desired operation. For example, the processor may add a value to the Bloom filter by placing a non-null data value into the selected address of the selected slice. Or, the processor may increment an integer value in the selected address of the selected slice in order to add an item to the Bloom filter. Similarly, at block 614 the processor may delete an item from the Bloom filter by placing a null data value into the selected address of the selected slice. Or, the processor may decrement an integer value in the selected address of the selected slice in order to delete an item to the Bloom filter. Alternatively, at block 614 the processor may perform a query to determine whether there exists a non-null value in the selected address of the selected slice.

As is stated above, it is intended that the other processors of the system may concurrently perform the method 600 in order to perform their part of the desired operation. Processing then ends at block 616.

Figure 7:
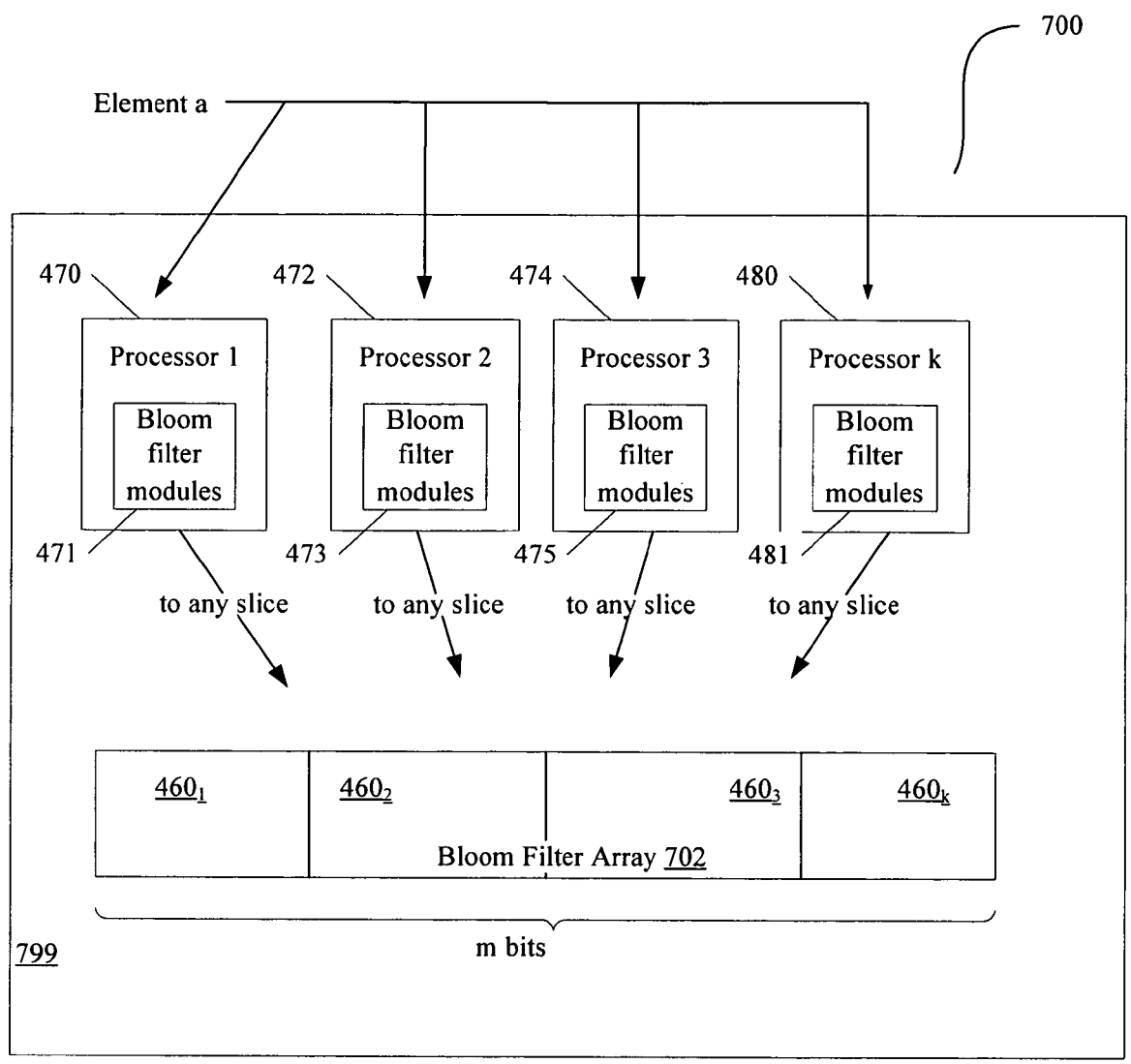
FIG. 7 is a block diagram illustrating at least one embodiment of a Bloom filter implementation that includes multiple processor cores.

FIG. 7 is a block diagram illustrating at least one embodiment of a Bloom filter implementation in a system 700 that includes multiple processor cores. The number of cores is represented by variable k. Although FIG. 7 depicts k=four processor cores (470, 472, 474, 480), such depiction is for illustrative purposes only. The number of processor cores, k, may be any positive integer greater than or equal to 2.

All m bits of the Bloom filter array are 702 are accessible to be hashed to by any of the k multiple cores. For at least one embodiment, the m bits are evenly distributed among k slices, such that each of the k slices is of size m/k bits, $460_1$-$460_k$. Accordingly, for a system 700 including k processor cores, each processor core computes the hash value (for a given input α) for one of the k slices ($460_1$-$460_k$) of the Bloom filter. However, each processor has access to the entire range of the Bloom filter array, so that for any input value a, the control function may assign any of the k slices to any of the k processors, with each processor being assigned a different one of the slices for a given input value, α.

Each of the processors cores 470, 472, 474, 480 may include Bloom filter logic modules 471, 473, 475, 481, respectively to compute the control value (see, e.g., block 609 of FIG. 6) and to compute the hash functions, (see, e.g., block 610 of FIG. 6). Each of the processor cores 470, 472, 474, 480 may execute its Bloom filter logic modules 471, 473, 475, 481, respectively, concurrently with one or more, or all, of the other cores.

FIG. 7 illustrates that the multiple processor cores 470, 472, 474, 480 may be part of a single chip package 799, thereby constituting a chip multi-processor. The chip package 799 may also include the Bloom filter memory array 702 as part of the on-chip portion (such as a cache) of a memory hierarchy. Alternatively, the Bloom filer memory array 702 may be off-chip.

FIG. 8 is a table diagram illustrating at least one embodiment of Bloom filter logic 800 that may executed by each processor in a multiprocessor system, such as the logic modules 471, 473, 475, 481 executed by the cores 470, 472, 474, 480, respectively, of multiprocessor system 700 illustrated in FIG. 7. At least one embodiment of the logic 700 of FIG. 7 is shown in FIG. 8 as pseudocode software instructions.

That is, for at least one embodiment, the Bloom filter logic 800 may be implemented as a set of tangible computer-accessible instructions, organized as software logic modules, embodied in a computer program product. The instructions, when executed by the processors of the multiprocessor system, perform Bloom filter processing that utilizes multiple processors in order to make even very long Bloom filter calculations more efficient. The Bloom filter logic 800 illustrated in FIG. 8 is designed to decrease coherence overhead. The specific code instructions illustrated in FIG. 8 are intended to be illustrative pseudocode only; the specific instructions, syntax and labels used in FIG. 8 should be taken to be limiting.

The pseudocode instructions illustrated in FIG. 8 are grouped into logic modules that are intended to illustrate at least one embodiment of pseudocode instructions for software logic modules to implement at least one embodiment of the software Bloom Filter logic illustrated in FIG. 6.

FIG. 8 illustrates that the Bloom filter logic 800 includes a declaration of the Bloom filter as an array of m integer elements. FIG. 8 also illustrates a function, Hash, that returns an integer value. The Hash function illustrated in FIG. 8 may, for at least one embodiment, roughly coincide with the logic blocks 604, 608, 609, 610, and 612 illustrated in FIG. 6.

More particularly, FIG. 8 illustrates pseudocode instructions for an ID Module 802, which provides logic to be executed during block 604 of FIG. 6.

FIG. 8 also illustrates pseudocode instructions for a Slice Size Module 806, which provides logic to be executed during block 608 of FIG. 6.

FIG. 8 also illustrates pseudocode instructions for a function call to a control module, 808, to be executed during block 609 of FIG. 6. Such control module 808 selects a unique slice for the processor, such that none of the other processors will hash to the selected slice of the Bloom filter for a given input value, a.

FIG. 8 also illustrates pseudocode instructions for a Hash Module 804, which module, logic to be executed during block 610 of FIG. 6.

FIG. 8 also illustrates pseudocode instructions for a Combine Module 808, which provides logic to be executed during block 612 of FIG. 6.

One of skill in the art will realize that the presentation of the logic 800 in psuedocode form in FIG. 8 should not be taken to be limiting. For at least one other embodiment, such logic 800 may be implemented via hardware circuit, or in firmware, or a combination of hardware, firmware and/or software.

The simplified pseudocode represented in FIG. 8 assumes that the array size, m, is a multiple of k in order to simplify the presentation.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Accordingly, alternative embodiments of the invention also include machine-accessible media containing instructions for performing the operations of the invention or containing design data, such as HDL, that defines structures, circuits, apparatuses, processors and/or system features described herein. Such embodiments may also be referred to as program products.

Such machine-accessible media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language While particular embodiments of the present invention have been shown and described, it will be obvious to those skilled in the art that changes and modifications can be made without departing from the scope of the appended claims. For example, the foregoing mechanism for preventing post-boot updates of microcode may be equally applicable, in other embodiments, to updates of other types of code rather than being limited to microcode stored in flash memory. For one such alternative embodiment, for example, the mechanisms and methods described herein may be utilized to prevent post-boot loading of other types of code patches, including macro-code or a collection of instructions encoded in the main instruction set.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A system comprising:
   a plurality of k single-ported memory slices, wherein k is greater than or equal to 2;
   a plurality of k bloom filter logic modules, each bloom filter logic module coupled to each of the k memory slices, wherein the plurality of k bloom filter logic modules each include a hash module to generate an address value and a control module to perform a control value; and
   wherein the plurality of k bloom filter logic modules include a property that, for a given input value, each of the plurality of k bloom filter logic modules is to produce a combined address and control value corresponding to a unique one of the k memory slices, such that no collisions occur among the memory slices for the given input value.

2. The system of claim 1, further comprising:
   a DRAM memory module.

3. The system of claim 1, wherein each of the plurality of k bloom filter logic modules is associated with one of k processors, wherein the k processors are included in a single chip package.

4. The system of claim 1, wherein the plurality of k single-ported memory slices are included in the single chip package.

5. The system of claim 1, wherein the plurality of bloom filter logic modules further include a slice size module to determine the size of the memory slices.

6. The system of claim 1, wherein the plurality of bloom filter logic modules further include a combine module to utilize the combined outputs of control module and hash module to select an address location in selected one of the slices.

7. The system of claim 1, further comprising:
   the plurality of k bloom filter logic modules coupled to the k memory slices; and
   wherein each of the plurality of k bloom filter logic modules is embodied as software logic for one of the k processors.

8. The system of claim 1, further comprising:
   the plurality of k bloom filter logic modules coupled to the memory slices; and
   wherein each of the plurality of k bloom filter logic modules is embodied as a hardware circuit for one of the k processors.

9. An apparatus comprising:
a plurality of k hash circuits to each produce a first value;
a control circuit to produce a control value for each of the k first values;
a plurality of k single-ported memory slices, each coupled to each of the hash circuits, wherein k is greater than or equal to 2;
a plurality of k bloom filter logic modules, each bloom filter logic module coupled to each of the k memory slices, wherein the plurality of k bloom filter logic modules each include a hash module to generate an address value and a control module to perform the control value; and
wherein the plurality of k bloom filter logic modules include a property that, for a given input value, each of the plurality of k bloom filter logic modules is to produce a combined address and control value corresponding to a unique one of the k memory slices, such that no collisions occur among the memory slices for the given input value.

10. The apparatus of claim 9, further comprising a multiplexer to associate the control value with a k first value such that the multiplexer selects an address in a unique of the k memory slices for a given input value, wherein the multiplexer comprises a k multiplexer.

11. The apparatus of claim 10, wherein:
the multiplexer is coupled with one of the hash circuits to receive an output from the control circuit.

12. A method comprising:
generating a control value to select a unique one of a plurality of k single-ported memory slices of an in-location bloom filter away of a plurality of k block filter logic modules for an input value, wherein k is greater than or equal to 2, each k bloom filter logic module coupled to each of the k memory slices, wherein the plurality of k bloom filter logic modules each include a hash module to generate an address value and a control module to perform the control value, wherein the plurality of k bloom filter logic modules include a property that, for a given input value, each of the k bloom filter logic modules is to produce a combined address and control value corresponding to a unique one of the k memory slices, such that no collisions occur among the memory slices for the given input value;
computing a hashed address value in range 0 . . . M/k for the input value; and
combining the hashed address value and the control value to select a location in selected one of the k single-ported memory slices such that the selected k single-ported memory slice is not selected for any other hashed address generated for the input value.

13. The method of claim 12, further comprising:
inserting a data value into the selected location in the selected one of the k memory slices.

14. The method of claim 12, further comprising:
incrementing a value in the selected location in the selected one of the k memory slices.

15. The method of claim 10, further comprising:
deleting a data value from the selected location in the selected one of the k memory slices.

16. The method of claim 12, further comprising:
decrementing a data value in the selected location in the selected one of the k memory slices.

17. The method of claim 12, further comprising:
querying the contents in the selected location in the selected one of the k memory slices.

18. The method of claim 12, further comprising:
determining the size of the k memory slices.

19. A machine-accessible storage medium comprising instructions which, when executed, cause a machine to:
generate a control value to select a unique one of a plurality of k single-ported memory slices of an m-location bloom filter array of a plurality of k block filter logic modules for an input value, wherein k is greater than or equal to 2, each k bloom filter logic module coupled to each of the k memory slices, wherein the plurality of k bloom filter logic modules each include a hash module to generate an address value and a control module to perform the control value, wherein the plurality of k bloom filter logic modules include a property that, for a given input value, each of the k bloom filter logic modules is to produce a combined address and control value corresponding to a unique one of the k memory slices, such that no collisions occur among the memory slices for the given input value;
compute a hashed address value in range 0 . . . M/k for the input value; and
combine the hashed address value and the control value to select a location in selected one of the k single-ported memory slices such that the selected slice is not selected k single-ported memory for any other hashed address generated for the input value.

20. The machine-accessible storage medium of claim 19, wherein the instructions which, when executed, further cause the machine to:
insert a data value into the selected location in the selected one of the k memory slices.

21. The machine-accessible storage medium of claim 19, wherein the instructions which, when executed, further cause the machine to:
increment a value in the selected location in the selected one of the k memory slices.

22. The machine-accessible storage medium of claim 19, wherein the instructions which, when executed, further cause the machine to:
delete a data value from the selected location in the selected one of the k memory slices.

23. The machine-accessible storage medium of claim 19, wherein the instructions which, when executed, further cause the machine to:
decrement a data value in the selected location in the selected one of the k memory slices.

24. The machine-accessible storage medium of claim 19, wherein the instructions which, when executed, further cause the machine to:
query the contents in the selected location in the selected one of the k memory slices.

25. The machine-accessible storage medium of claim 19, wherein the instructions which, when executed, further cause the machine to:
determine the size of the k memory slices.

* * * * *

UNITED STATES PATENT AND TRADEMARK OFFICE
CERTIFICATE OF CORRECTION

PATENT NO. : 7,620,781 B2  Page 1 of 1
APPLICATION NO. : 11/642314
DATED : November 17, 2009
INVENTOR(S) : Breternitz et al.

It is certified that error appears in the above-identified patent and that said Letters Patent is hereby corrected as shown below:

In column 11, at line 32 delete, "in-location" and insert --m-location--.

Signed and Sealed this

Sixth Day of April, 2010

David J. Kappos
*Director of the United States Patent and Trademark Office*